(12) United States Patent
Iwamura

(10) Patent No.: US 7,701,330 B2
(45) Date of Patent: Apr. 20, 2010

(54) POWER LINE COMMUNICATION NETWORK SECURITY SYSTEM

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 648 days.

(21) Appl. No.: 11/378,684

(22) Filed: Mar. 16, 2006

(65) Prior Publication Data

US 2007/0222578 A1    Sep. 27, 2007

(51) Int. Cl.
*G08B 1/08* (2006.01)

(52) U.S. Cl. ............. 340/538; 340/538.15; 340/310.11; 340/310.16; 340/825.36; 340/825.49

(58) Field of Classification Search .................. 340/538, 340/538.15, 310.11, 310.16, 825.36, 825.49
See application file for complete search history.

(56) References Cited

U.S. PATENT DOCUMENTS

| | | | |
|---|---|---|---|
| 4,429,299 A | 1/1984 | Kabat et al. | |
| 4,731,810 A | 3/1988 | Watkins | |
| 6,226,370 B1 | 5/2001 | Shih | |
| 6,278,357 B1 | 8/2001 | Croushore et al. | |
| 6,392,538 B1 | 5/2002 | Shere | |
| 6,441,723 B1 | 8/2002 | Mansfield, Jr. et al. | |
| 6,661,798 B2 | 12/2003 | Sano et al. | |
| 6,801,529 B1 | 10/2004 | McGrane et al. | |
| 6,813,505 B2 | 11/2004 | Walley et al. | |
| 6,822,555 B2 | 11/2004 | Mansfield, Jr. et al. | |
| 6,967,565 B2 | 11/2005 | Lingemann | |
| 6,975,635 B2 | 12/2005 | Takeyama et al. | |
| 2005/0267605 A1* | 12/2005 | Lee et al. ........................ 700/19 |

* cited by examiner

*Primary Examiner*—Daryl Pope
(74) *Attorney, Agent, or Firm*—Fitch, Even, Tabin & Flannery

(57) ABSTRACT

The present embodiments provide methods, apparatuses, and systems for use in implementing security systems. Some embodiments provide methods that receive a remote alarm message broadcast across an external power line communication (PLC) network at a first internal PLC security system coupled with the external PLC network from a remote second internal PLC security system coupled with the external PLC network with the remote alarm message comprising an alarm identifier of a local alarm message from the remote second internal PLC security system, and trigger a local alert at the first internal PLC security system indicating that the remote alarm message has been received across the external PLC network.

17 Claims, 13 Drawing Sheets ical warning; and a processor communicationally coupled with the PLC network interface and the local alert device, the processor receives the remote alarm message from the PLC network interface and activates the local alert device to generate the local warning as a notification that the remote alarm message has been received.

A better understanding of the features and advantages of the present invention will be obtained by reference to the following detailed description of the invention and accompanying drawings which set forth an illustrative embodiment in which the principles of the invention are utilized.

POWER LINE COMMUNICATION NETWORK SECURITY SYSTEM

FIELD OF THE INVENTION

The present invention relates generally to power line communication (PLC) networks, and generally to security systems employing PLCs.

BACKGROUND

Electronic security systems for buildings and dwellings have been around for decades. Typically, security systems generate an audible noise in the event of a breach or transmit a communication, typically over a telephone line, to a remote security center. The generation of an audible alarm provides notification to neighbors and/or neighboring buildings.

Additionally, some security systems provide direct connections between neighboring residences to notify neighbors. Hardwired connections between security systems in neighboring residences are often prohibitively expensive due to the need to run new wiring between the residences and limited by physical considerations such as distance between the residences. Wireless connections can be unpredictable and prone to limited coverage.

SUMMARY OF THE EMBODIMENT

The present invention addresses the needs above as well as other needs through the provision of the methods, apparatuses, and systems for use in the implementing security systems and/or communicating alarm messages to neighboring security systems over a power line communication (PLC) network. Some methods according to some embodiments receive a remote alarm message broadcast across an external power line communication (PLC) network at a first internal PLC security system coupled with the external PLC network from a remote second internal PLC security system coupled with the external PLC network with the remote alarm message comprising an alarm identifier of a local alarm message from the remote second internal PLC security system, and trigger a local alert at the first internal PLC security system indicating that the remote alarm message has been received across the external PLC network.

Some embodiments provide power line security systems. These systems can comprise an alarm trigger coupled to an internal power line communication (PLC) network that communicates a first local alarm message across the internal PLC network; a local alarm message receiver communicationally coupled to the internal PLC network that receives the first local alarm message from the alarm trigger; a remote alarm message transmitter communicationally coupled to the local alarm message receiver, the remote alarm message transmitter transmits a first remote alarm message over an external PLC network; a remote alarm message receiver receives a second remote alarm message from over the external PLC network; and a local alert device communicationally coupled to the remote alarm message receiver and produces a local alert signal when the remote alarm message receiver receives the second remote alarm message from over the external PLC network.

Other embodiments provide a power line communication security system. These systems include a power line communication (PLC) network interface communicationally coupled to an external PLC network, and the PLC network interface receives a remote alarm message broadcast over the external PLC network; a local alert device that generates a

BRIEF DESCRIPTION OF THE DRAWINGS

The above and other aspects, features and advantages of the present invention will be more apparent from the following more particular description thereof, presented in conjunction with the following drawings wherein.

Figure 1:
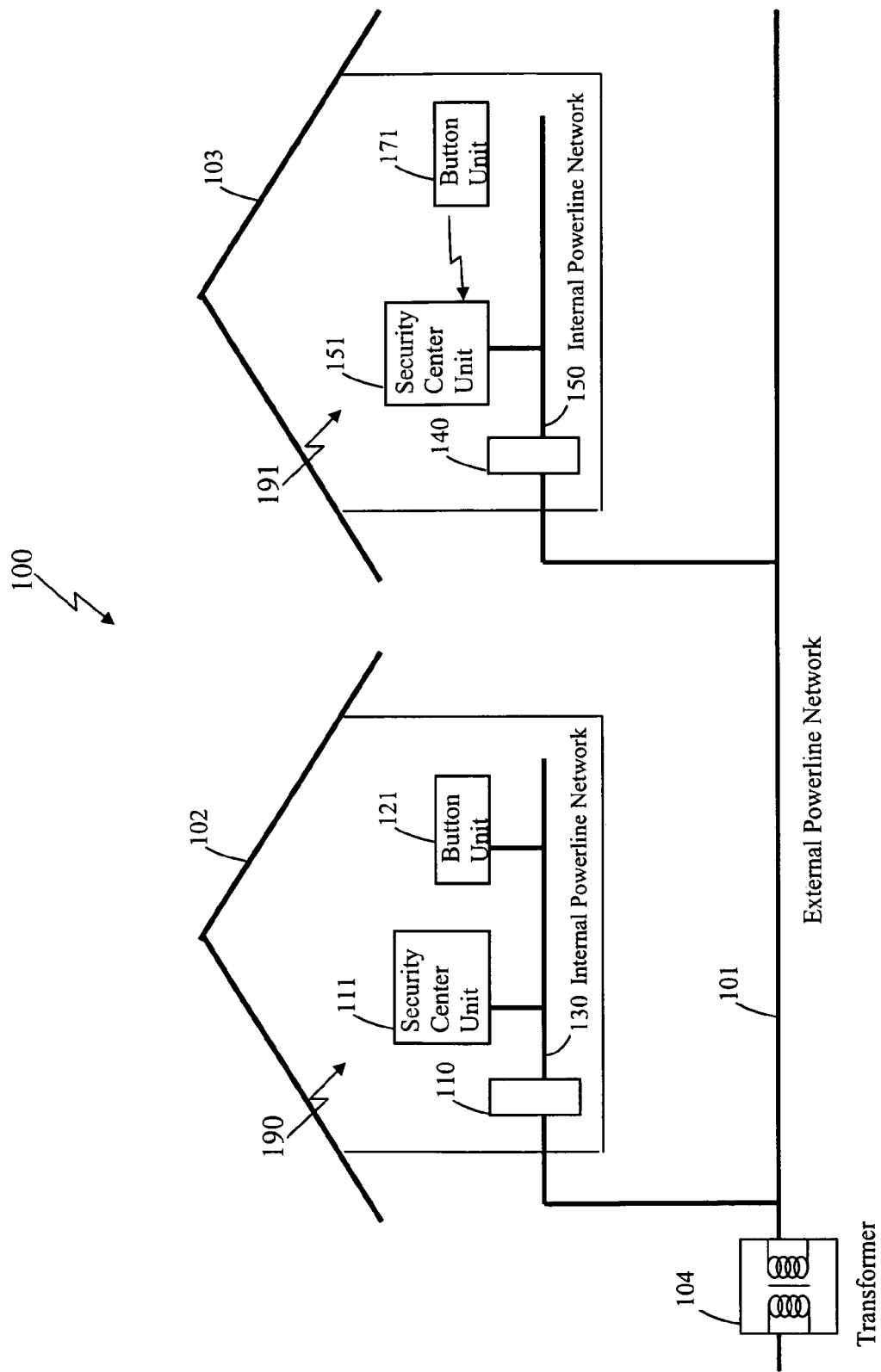
FIG. 1 depicts a simplified block diagram of a plurality of local power line communication (PLC) security systems coupled to an external PLC network according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide apparatuses, systems and methods for use in implementing PLC security systems, including communicating alarm messages between neighboring security systems through a PLC network. A number of embodiments are provided herein for illustrative purposes only and should not be construed to limit the scope of the present invention.

FIG. 1 depicts a simplified block diagram of a power line communication (PLC) security network 100 employing multiple local or internal PLC security systems 190, 191 communicationally connected through a global or external PLC network 101 according to some embodiments. The PLC security network 100 in part allows notification of alarm conditions and/or other communications between internal PLC security systems 190, 191. Each internal PLC security system 190, 191 includes a security center unit 111, 151, an internal or local PLC network 130, 150, and an alarm activation unit 121, 171, such as a button, trigger, sensor or other activation unit. For example, a first internal PLC security system 190 can be employed in a first building or residence 102. The first internal PLC security system 190 comprises a first security center unit 111 and an alarm activation unit, such as a PLC network button unit 121 ("PLC button unit"). The first security center unit 111 and the PLC network button unit are coupled to a first internal PLC network 130. The first internal PLC network 130 is further coupled with the external PLC network 101 through a first switchboard and/or breaker board 110. The first internal PLC network 130 comprises at least a portion of the internal electrical utility power lines of the residence 102 supplying electrical power throughout the residence. The external PLC network 101 comprises the electrical utility power lines that supply electrical power to the residences 102, 103.

The PLC button unit 121 is communicationally coupled to the security center unit 111 through the internal PLC network 130 and is an alarm trigger. When activated, the PLC button unit sends a local alarm message to the security center unit 111 over the internal PLC network 130. In some embodiments, the security center unit 111, upon the receipt of the local alarm message, activates a local alert device that produces a local alarm notification, such as an audible alarm, and in some implementations further transmits a remote alarm message across the external PLC network 101.

A second PLC security system 191 is installed in a second residence 103 and further couples with the external PLC network 101. The second internal PLC security system 191 comprises a second security center unit 151 and an alarm activation unit, such as a wireless alarm trigger or button unit 171. In some embodiments, a security center unit 151 comprises a wireless receiver that allows the security center unit to wirelessly receive alarm messages from a wireless button unit 171.

The second security center unit 151 is coupled to a second internal PLC network 150 that is coupled to the external PLC network 101 through a second breaker board and/or switchboard 140. The wireless button unit 171 comprises a wireless transmitter. When the wireless button unit 171 is activated, the wireless button unit 171 wirelessly transmits a local alarm message to the security center unit 151. The security center unit 151 wirelessly receives the alarm message through a wireless receiver and, in some embodiments, actives a local alert device that notifies the residences, such as produces an audible alarm. Typically, the second security center unit 151 additionally broadcasts a remote alarm message relevant to the local alarm message across the external PLC network 101.

In operation, when a user activates the PLC button unit 121 (or other alarm activation unit is activated), the PLC button unit 121 transmits an alarm message over the internal PLC network 130 to be received by the first security center unit 111. The first security center unit 111 then broadcasts a remote alarm message over the external PLC network 101 in response to the local alarm message. Alternatively in some implementations, the PLC button 121 may directly send an alarm message to the second security center unit 151. The remote alarm message is then received by the second security center unit 151 located in the second residence 103 and coupled with the external PLC network 101. The second security center unit 151 activates a local alert device, such as an audible buzzer, to notify and/or warn the resident at the second residence 103 of an emergency condition at the first residence 102. The resident of second residence 103 can then, for example, call 911 in order to summon help for the neighbor in the first residence 102. Additionally, in the case of an intruder, robbery or other crime the neighbor at the second residence 103 may be a valuable witness to the crime.

The PLC security network 100 can include additional internal PLC security systems coupled to the external PLC network 101. The additional internal PLC security systems may, for example, further comprise a PLC security system center unit and one or more alarm activation units, such as PLC security system button unit(s), PLC wireless button unit(s), a sensor(s), and/or other relevant activation units.

Figure 2:
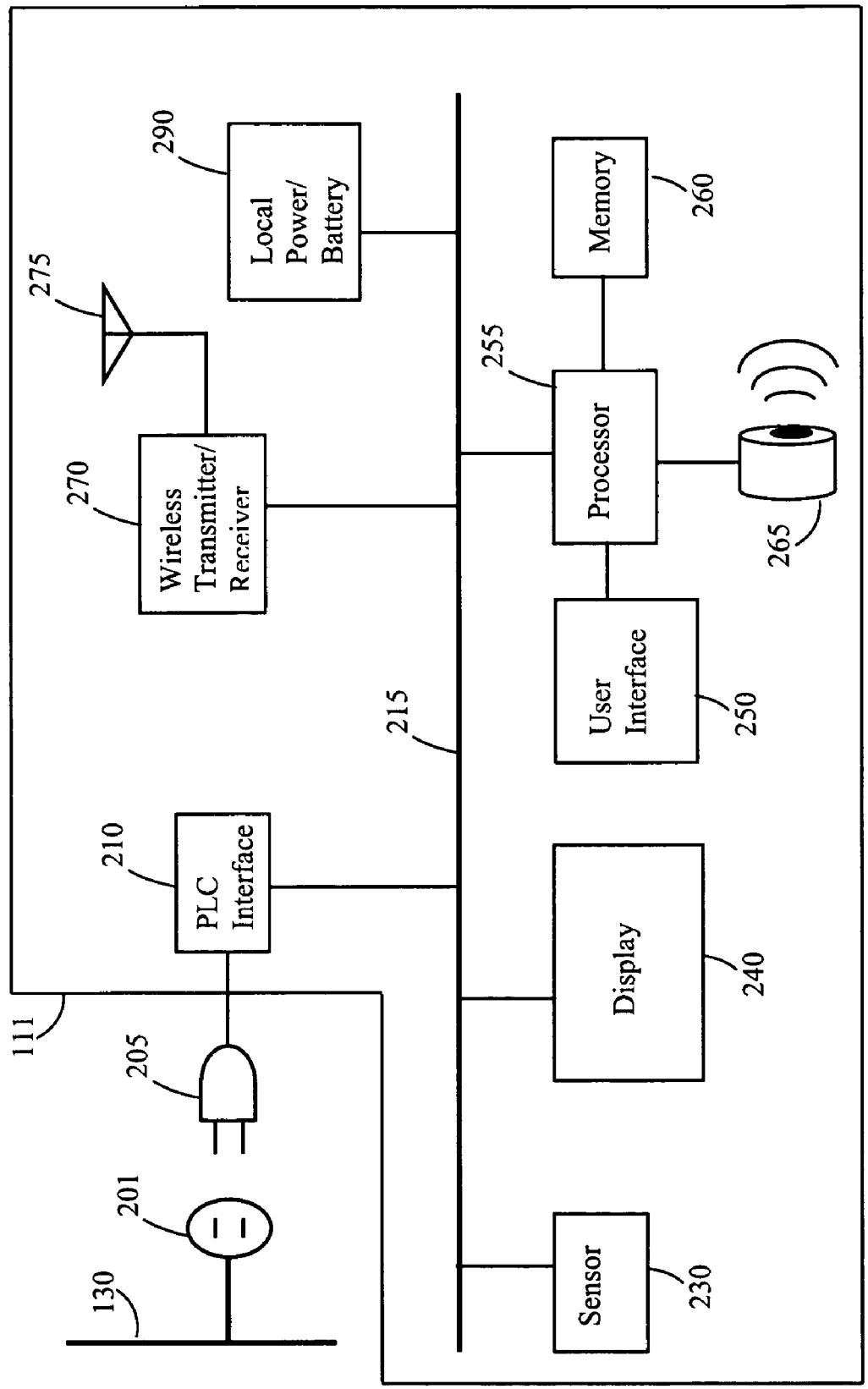
FIG. 2 depicts a simplified block diagram of a security center unit employed in the internal PLC security systems of FIG. 1.

FIG. 2 depicts a simplified block diagram of a security center unit 111 according to some embodiments. The security center unit 111 provides general control for the internal PLC security system 190, and in some embodiments, includes a power line communication network interface ("PLC interface") 210, an internal bus 215, a processor or controller 255 coupled to the internal bus 215, and a memory 260 coupled to the processor 255. In some implementations, the security center unit 111 further includes a display 240 coupled to the internal bus 215, a user interface 250 communicationally coupled to the processor 255 either directly, over the bus or otherwise communicationally coupled, an alarm notification device 265 (e.g., an auditory signaling device) communicationally coupled to the processor 255, a wireless transmitter/receiver 270 communicationally coupled to the internal bus 215, an antenna 275 coupled to the wireless transmitter/receiver 270, and an alarm activation unit, such as a sensor 230 or other activation unit. In some embodiments, the security center unit 111 includes a local power source 290, such as one or more batteries, solar cells and/or other such sources to allow the security center unit to operate when power cannot be received through the internal PLC network 130.

The processor 255 can be implemented through one or more microprocessors, computers, processors, central processing units (CPU), microcontroller, system-on-a-chip (SOC), application specific integrated circuit(s) (ASIC), and/or other such devices for providing overall functionality, data processing and/or implementing control over the security center unit 111 and/or internal PLC security systems 190. The memory 260 stores software programs, executables, data, control programming, scheduling, runtime parameters, operation conditions and parameters, other relevant programs and data, and/or instructions executable by a processor, machine or computer. The memory can be implemented through ROM, RAM, erasable programmable read-only memory (EPROM), electrically-erasable programmable read-only memory (EEPROM), disk drives, flash memory, removable medium (e.g., floppy disc, hard disc, compact disc (CD), digital versatile disc (DVD) and the like), and substantially any other relevant memory or combinations of memory. Generically, the memory 260 may also be referred to as a computer readable medium. The security center unit and/or internal PLC network control provided through the processor 255 may be implemented by software stored in memory and executed on a processor and/or stored and executed in firmware. Further, the one or more processors 255 can be implemented through logic devices, hardware, firmware and/or combinations thereof. Thus, the processor 255 described herein may be implemented using substantially any relevant processor logic or logic circuitry. In some embodiments, the processor 255 is implemented through a computer running software and/or firmware to implement control as described above and further below.

The display 240 may be substantially any form of display configurable to display an alarm message, such as, but not limited to, a liquid crystal display (LCD), plasma, and other relevant displays. Further, in some implementations, the display can provide a user with information, parameters, and/or statistics about the internal PLC security system 190 and/or the PLC security network 100. The user interface 250 may be substantially any form of user interface that enables a user to interact with and/or configure the PLC security center unit 111 and/or internal PLC security system 190, such as, for example, a keypad, button pad, touch screen, mouse, stylist and/or other such relevant interfaces. In some embodiments, the user interface enables a user to enter parameters, thresholds, control information, other information such as resident information (e.g., a resident name and an address) to be transmitted as part of a remote alarm messages over the external PLC network 101 to a remote neighbor's PLC security system 191. The user interface 250 allows a user to enter and/or adjust parameters, information and/or other settings used by the processor 255 at least in part in controlling the security center unit 111 and/or internal PLC security system 190. In some embodiments, the alarm notification device 265 includes a buzzer, speaker and/or other device capable of producing human-audible sounds for alerting residents of an emergency situation. The internal bus 215 provides communication path(s) between components of the security center unit 111 and can be implemented through substantially any relevant bus(es), such as an Inter-Integrated Circuit ("I2C") bus.

In some embodiments, the security center unit 111 is communicationally coupled to the internal PLC network 130 through a plug interface 205 that plugs into an electrical power outlet 201 that is directly coupled to and/or hardwired with the internal PLC network 130. In embodiments where the security center unit is coupled to the internal PLC network 130 through the plug interface 205, the security center unit 111 could be unplugged and moved to substantially any location in the dwelling 102 where a power outlet 201 is located. Additionally and/or alternative, the security center unit 111 may be hardwired to the internal PLC network 130. For example, a security center unit 111 may be permanently installed in a wall near one or more entrances to a residence where the PLC security system may be activated and deactivated when entering and exiting the residence.

The PLC interface 210 and the wireless transmitter/receiver 270 both function as local alarm message receivers. Local alarm messages are used for communication among the components of an internal PLC security system 190 installed within a residence 102. Some embodiments additionally and/or alternatively provide for alarm messages to be transmitted wirelessly to the local security center unit 111. The PLC interface 210 receives local alarm messages transmitted over the internal PLC network 130 from alarm triggers and/or sensors, such as door, window, or motion sensors, PLC network interface button units and/or other such alarm activation unit 121. Additionally, in those embodiments that include the wireless transmitter/receiver 270, the wireless transmitter/receiver 270 can also receive local alarm messages transmitted, for example, by a local wireless button unit 171 as further described below.

Further, the PLC interface 210 also functions as one or both a remote alarm message transmitter and a remote alarm message receiver. Remote alarm messages are used for communicating between PLC security systems and are, for example, used to communicate information relevant to a local alarm message from a first internal PLC security system 190 to a remote second internal PLC security system 191. The PLC interface 210 is configured to transmit remote alarm messages across the external PLC network 101 in order to enable communications between internal PLC security systems 190, 191 installed in separate residences 102, 103. The PLC interface is also configured to receive remote alarm messages from across the external PLC network 101.

In some embodiments, the security center unit 111 may receive local alarm messages from an alarm trigger such as a PLC button unit 121, alarm sensor 230 or other alarm activation unit 121 over the internal PLC network 130. Alarm sensors 230 can include one or more sensors on doors, windows, pressure pads, motion detectors and/or other sensors that transmit a local alarm message. The alarm sensor 230 may be communicationally coupled to the internal PLC network 130 through a PLC network interface, may be wirelessly connected to the security system unit 111 through a wireless transmitter, and/or may be directly coupled with or part of the security center unit 111. The security center unit may additionally and/or alternatively receive local alarm messages from a wireless button unit 171 through the wireless transmitter/receiver 270. In some embodiments, when a local alarm message is received, for example from a PLC button unit 121 or wireless button unit 171, the security center unit 111 activates a local alert signal that can activate one or more alarm notification devices, such as a buzzer 265, display 240 and/or other alarm notification (e.g., causing a television to display and generate an audible alarm as further described below) in attempts to notify the local resident(s) of the activation of the alarm. Additionally or alternatively, the security center unit 111 can generate and broadcast a remote alarm message over the external PLC network 101, and/or communicate an additional message to be broadcast over a distributed network, such as the Internet, public switching telephone network or other network to notify a security company, police, fire department and/or other services through a modem, wirelessly or other such network interface.

The remote alarm message, in some implementations, includes alarm data relevant to and/or received in the local alarm message. The remote alarm message typically includes source identification information identifying the source of the alarm, such as the name of a resident from which the remote alarm is initiated, address of the residence from which the remote alarm is initiated, alarm type identifier(s), and/or other such information. The alarm type identifiers may comprise, for example, fire alarm information, such as a location of a fire in the residence; medical alarm information indicating a need for medical assistance; burglar alarm information comprising for example an identifier for a door, window or motion sensor that has been triggered; and/or other such information. An alarm message may also be triggered at the security center unit itself, for example, using the user interface 250 and/or other activation unit in some embodiments.

When an alarm message is received through the PLC interface 210 or the wireless transmitter/receiver 270, the local alarm message is sent to the processor 255. The processor 255 can activate a local alert device, such as a buzzer 265. The processor 255 can additionally generate a remote alarm message, which can include predefined information and/or alarm condition specific information as introduced above and further described below, and forwards the remote alarm message to the PLC interface to be broadcasted over the internal PLC security system 190 and onto the external PLC network 101.

Figure 3:
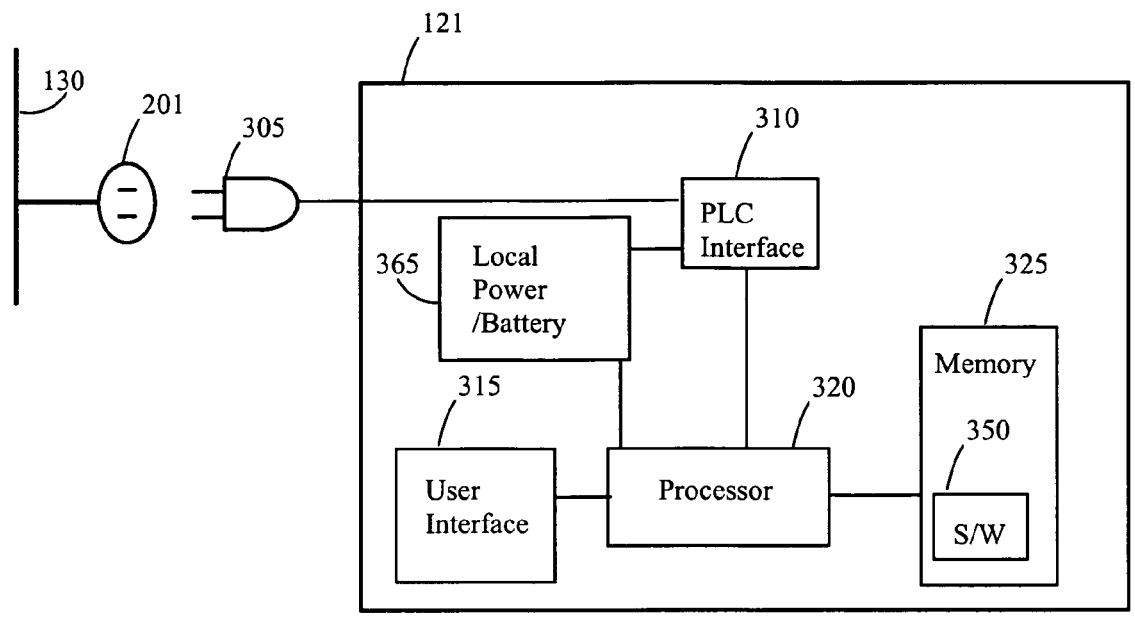
FIG. 3 depicts a simplified block diagram of a PLC security system that can be used in the internal PLC security system of FIG. 1.

FIG. 3 depicts a simplified block diagram of a PLC button unit 121 according to some embodiments comprising a PLC interface 310, a processor 320, a memory 325 containing software 350, a user interface 315, and optionally a local power source 365 (e.g., battery(ies), solar cell(s), and the like). The processor 320 and memory 325 can be similar to the processor 255 and memory 260 of the security center unit 111 as described above. The local power source 365 allows the PLC button unit 121 to generate and transmit local alarm messages even when power cannot be received through the internal PLC network 130 with other local or remote devices that are receiving power and/or have local power sources. The user interface 315 enables a user to at least trigger an alarm. When the alarm is triggered, the PLC interface 310 transmits a local alarm message over the internal PLC network 130 to a security center unit 111. For example, a PLC security system 190 may comprise one or more PLC button units installed in various rooms of a residence 102. A sensor 230 can be implemented similar to the PLC button unit 121 of FIG. 3 with an additional sensor switch or trigger indicating a sensed event has been detected.

In some embodiments, the user interface 315 comprises a single alarm button that a user presses in order to activate the transmission of an alarm message. Additionally or alternatively, the user interface 315 can include a keypad, button pad or the like. For example, the user interface 315 may comprise a keypad with keys defined for one or more emergencies such as a fire button, a robbery button, a medical emergency button and/or other such buttons. When the user the presses a key associated with a particular type of emergency, the processor 320 generates a local alarm message for the specified type of emergency stored in memory 325 and forwards the local alarm message to the PLC interface 310 to be transmitted over the internal PLC network 130. The security center unit 111 can then utilize this information when generating a remote alarm so that a neighbor receiving the remote alarm message would be aware of the type of alarm condition and then be able to contact the appropriate authorities for assistance.

In some embodiments, the PLC button unit 121 further comprises a plug interface 305 used to couple the PLC button unit 121 to a power outlet 201 coupled to the internal PLC network 130. The internal PLC network 130 provides network communication capability to the PLC button unit 121 and may also provide electrical power to the PLC button unit 121. Employing a plug interface 305 allows the button unit to be located anywhere in a residence within proximity to an electrical outlet 201 coupled to internal PLC network 130. In some alternate embodiments, the PLC security system button unit is directly hardwired to the internal PLC network 130. In new construction, for example, it may be advantageous to directly hardwire the button unit onto the internal PLC network, so that the button unit does not have to be located in proximity to an electrical outlet 201 and would thus free the electrical outlet 201 for other uses. In some implementations, a PLC button unit 121 may be build into a consumer electronic device 700 (see FIG. 7) coupled to the internal PLC network 130, such as, for example, a clock radio, stereo system, television and/or other such consumer electronic devices.

Still referring to FIG. 3, the memory 325 of the PLC button unit 121 may be substantially any form of readable electronic memory as described above. In some embodiments, the memory 325 stores an identifier of the PLC button unit 121, one or more alarm messages, and/or other such information that the processor 320 can include in a local alarm message forwarded to the PLC interface 310 to be transmitted over the internal PLC network 130.

Figure 4:
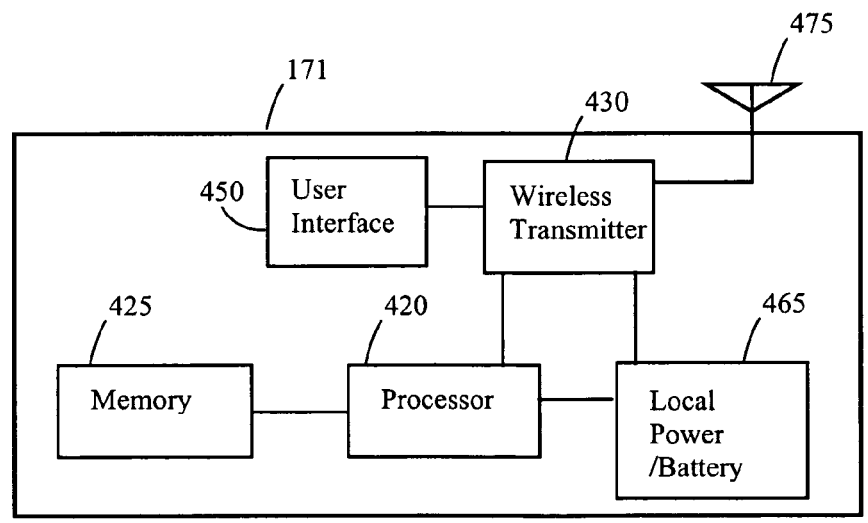
FIG. 4 depicts a simplified block diagram of a PLC security system wireless button unit.

FIG. 4 depicts a simplified block diagram of a wireless button unit 171 according to some embodiments that includes a processor 420, a user interface 450, memory 425, a wireless transmitter 430, an antenna 475 and a power source 465. The processor 420 and memory 425 can be similar to the processor 255 and memory 260 of the security center unit 111 as described above. The wireless transmitter 430 is coupled to the antenna 475 through which alarm messages are wirelessly transmitted to a local security center unit 151 within range of the wireless button unit 171 when the user interface 450 is activated. The user interface may comprise one or more buttons or button configurations similar to the button configurations of the user interface 315 of the PLC button unit 121 described above with regard to FIG. 3.

The wireless button unit 171 functions as an alarm trigger for a local PLC security system 190 and may be used in conjunction with or instead of the PLC button unit 121, sensors 230 and/or other alarm activation units. For example, a PLC security system 190 may comprise one or more wireless button units 171, PLC button units 121 and/or sensors on exterior doors and windows installed in various rooms of a residence. Unlike the PLC button unit 121, a wireless button unit 171 is not directly coupled to the internal PLC network 130. Instead, the wireless button unit 171 wirelessly broadcasts alarm messages to a security center unit 111 via the wireless transmitter 430.

The power source 465 powers the components of the wireless button unit 171 and can be implemented through one or more batteries (e.g., alkaline batteries, rechargeable batteries, and the like), solar cells, other portable power sources and/or combinations of power sources. The wireless button unit may be placed substantially anywhere in the residence, so long as the wireless button unit 171 is able to establish a wireless connection to a security center unit 111. Thus, for example, wireless button unit 171 could be hidden under a desk or in another inconspicuous location where a user could activate the wireless button unit without alerting an intruder or robber that an alarm has been triggered.

Figure 5:
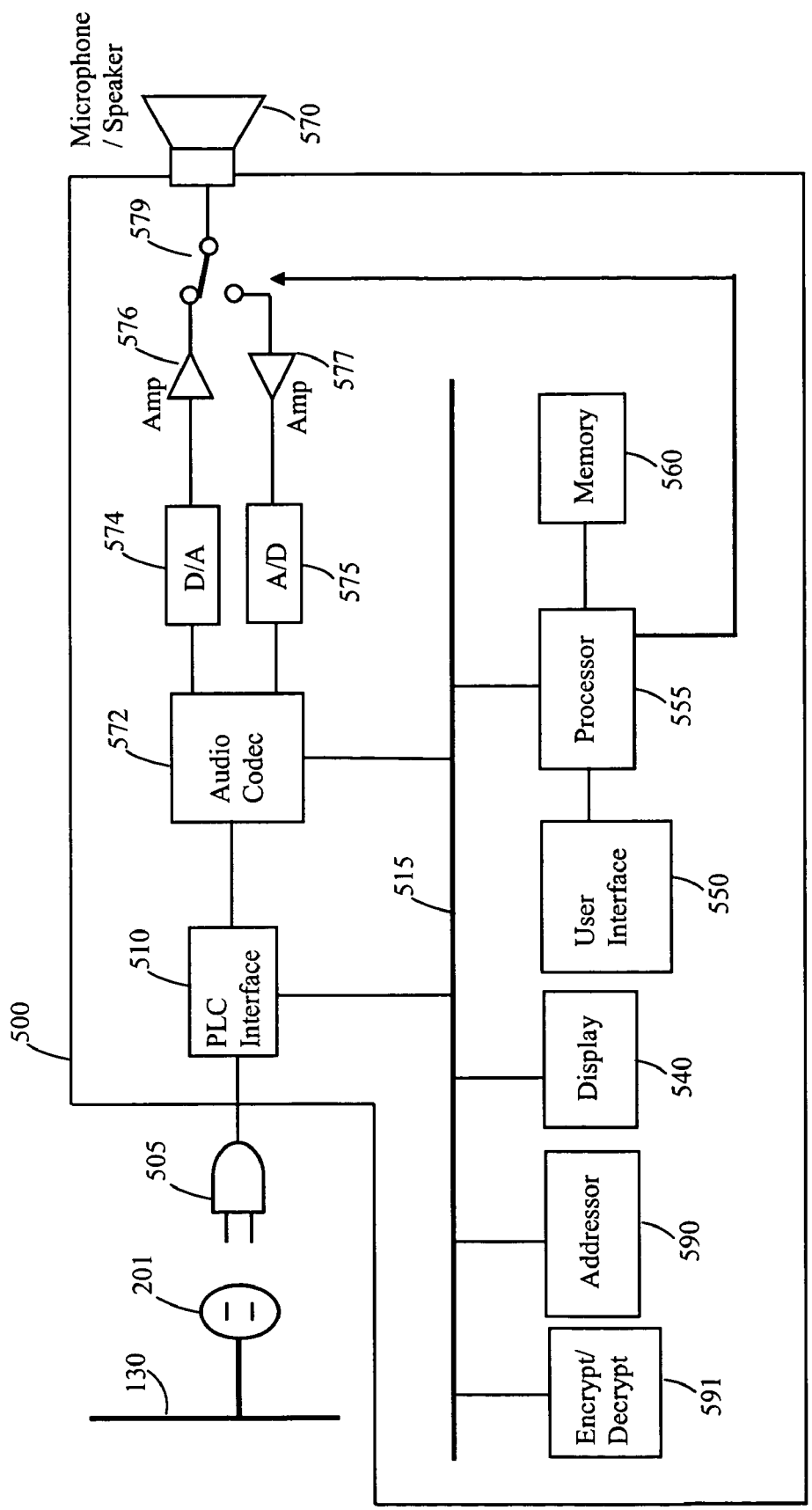
FIG. 5 depicts a simplified block diagram of a PLC security system intercom unit.

FIG. 5 depicts a simplified block diagram of a PLC security system intercom unit 500 according to some embodiments. The PLC security system intercom unit 500 allows voice data to be communicated over the internal PLC network 130 and/or the external PLC network 101. The intercom unit 500 can be implemented as a separate stand alone device coupled with the internal PLC network 130, incorporated into the security center unit 111, be implemented with an alarm activation unit (e.g., PLC button unit 121, wireless button unit 171) and/or incorporated into other consumer electronic devices. In some implementations, the intercom unit 500 includes a PLC network interface 510 (PLC interface), an internal bus 515, a display 540, a processor 555, a user interface 550, a memory 560, an audio codec 572, a digital-to-analog converter 574, an amplifier 576, an analog-to-digital converter 575, an amplifier 577, a switch 579, a microphone and/or speaker 570, and a electrical outlet adaptor 505 and/or other power source (e.g., batteries, solar, etc.). The electrical outlet 505 is communicationally coupled to the PLC interface 510 and couples the intercom unit 500 to an electrical outlet 201 coupled to an internal PLC network 130. In some embodiments, the PLC security system intercom unit may be hardwired to the internal PLC network 130.

The processor 555 controls the switch 579 directing whether the microphone/speaker 570 acts as a microphone to receive voice data or as a speaker to play voice data received over the internal PLC network 130 by the PLC interface 510. Some embodiments include separate microphone and speaker systems so that the processor does not have to switch between them. The PLC interface 510 transmits and receives PLC signals including PLC command signals from and/or to the security center unit 111, and additionally functions as both a PLC voice communications transmitter and as a PLC voice communications receiver. The PLC interface 510 is configured to receive voice data from both the internal PLC network 130 and the external PLC network 101. Voice data received by the PLC interface is then decoded by the audio codec 572 and passed through the digital-to-analog converter 574 to produce an analog signal. The analog signal is amplified by amplifier 576 and the signal is played by the microphone/speaker 570. The PLC interface 510 may also receive alarm messages. When the PLC interface receives an alarm message over the internal PLC network 130, the PLC interface 510 sends the alarm message to the processor 555. The processor 555 sends warning sound data to the audio codec 572. The audio codec 572 decodes and forwards the warning sound data to the digital-to-analog converter 574 that converts the decoded data into an analog signal that is played by the microphone/speaker 570. In some embodiments, the intercom unit may be integrated into a security center unit 111 or into a consumer electronic device 700 coupled to the internal PLC network 130, such as, for example, a television or stereo system.

The intercom unit 500 may also transmit voice data to other local and/or remote intercom units by broadcasting the voice data over the internal and/or external PLC networks 130, 101, respectively. When voice data is to be detected and transmitted over the internal PLC network 130 and/or external PLC network 101, the switch 579 is set to a setting that activates the microphone 570. Analog voice data captured by the microphone is amplified by the amplifier 577 and the analog-to-digital converter 575 converts the analog voice data to digital voice data. The digital voice data is encoded by the audio codec 572 and forwarded to the PLC interface 510. The PLC interface 510 transmits the data over the internal PLC network 130.

In some embodiments, the intercom unit 500 may be configured to transmit in local broadcast mode, remote broadcast mode, point-to-point transmission mode or other such modes. The user may select a transmission mode through the user interface 550. In local broadcast mode, voice communications are broadcasted by the PLC interface 510 across the internal PLC network 130 locally broadcasting to the in-home devices of the local internal PLC security system 190. Additionally and/or alternatively, the local broadcasts may be encrypted prior to transmission in order to limit a neighbor's ability to listen to the local voice communication(s) even when the signal strength is sufficient to reach an intercom unit coupled to an internal PLC network in a neighbor's residence. Furthermore, in some embodiments, the processor 555 and/or PLC interface 510 can incorporate an intercom unit and/or security system identifier, such that an intercom unit 500 limits the playback of voice data to instances when an identifier in the received voice data matches the local PLC security system 190, is included in a list stored in memory 560 of identifiers assigned to internal PLC security system 190, or other such verified identification.

In remote broadcast mode, the intercom unit 500 attempts to communicate with remote intercom units in neighboring or remote PLC security systems 191, and the voice data is transmitted from the PLC interface 510 with sufficient power across the internal PLC network 130 and external PLC network 101 in an attempt to communicate with a second intercom unit coupled to a second PLC security system 191 in a second residence 103. In some embodiments, the PLC interface 510 comprises a variable power transmitter that can be set to a higher and/or maximum power level when transmitting in remote broadcast mode than in local broadcast mode. The transmission power level is set to the higher or maximum power level, for example, in order to overcome signal attenuation that may result as the signal is carried over the internal PLC network 130 and/or the external PLC network 101 that might prevent the signal from being accurately received at the second intercom unit in the second PLC security system 191.

The intercom unit 500 may additionally or alternatively include a point-to-point transmission mode in order to communicate with a specific PLC security system and/or intercom unit of a specific PLC security system. Intercom units configured to provide point-to-point transmissions further comprise an address determination system 590 and an encryption and/or decryption system 591 or other security system that may be implemented through the processor 555 and/or through separate components. The address determination system 590 enables a user to select a destination intercom unit for the voice communication. In some embodiments, the address determination system is communicationally coupled to the memory 560 and display 540 to retrieve and generate a list of PLC security systems 191 and/or specific intercom units of the local PLC security system 190 and/or remote PLC security systems 191 coupled to the external PLC network 101 to which the user may communicate. The user can select through the user interface 550 and/or the display (e.g., touch screen display) a destination system or address for the voice communication from the list using the user interface 550. Additionally and/or alternatively, in some embodiments, the user may enter through the user interface 550 a unique intercom unit and/or security system identifier or address of a remote PLC security system 192 on the external PLC network 101 to which the user wishes to communicate.

The encryption and/or decryption system 591 provides for secure communications between the user and the neighbor during local and/or point-to-point communication by encrypting the voice communication for transmission and/or decrypting received communications. Without the encryption or use of other protection voice communications broadcasted across the external PLC network 101 may be received by one or more other neighbors allowing the other neighbors to listen in on the conversation as the voice data is broadcast across the external PLC network 101.

The PLC security network 100 can include substantially any number of internal PLC security systems 190, 191, and is typically limited by the constraints of the external PLC network 101. In many instances, the number of internal PLC security systems that may be communicationally coupled over the external PLC network 101 may be limited, for example, due to signal deterioration and/or attenuation over the external PLC network 101 (and/or internal PLC network 130) and/or through power line transformer(s) 104. Typically, a limited number of homes and/or buildings connect to the electrical utility power grid through a shared transformer 104.

For example in some instances, less than ten homes may share a single transformer through which electrical power is received from the electrical utility power grid. PLC signals often experience relatively significant signal attenuation as the signals attempt to pass through the power line transformer 104. The attenuation to the PLC signal generally precludes PLC signals from being communicated beyond the transformer 104 without additional equipment to bridge the transformer and/or amplify the signal. Therefore, communications between internal PLC security systems 190, 191 over the external PLC network 101 are often limited to those internal PLC security systems 190, 191 that share a transformer 104. The communications between internal PLC security systems 190, 191 may further be limited in some instances due in part to signal attenuation over the external PLC network 101 such that houses that are separated, for example, by more than five to eight houses or less, may not be able to directly communicate over the external PLC network 101 accurately.

Figure 6:
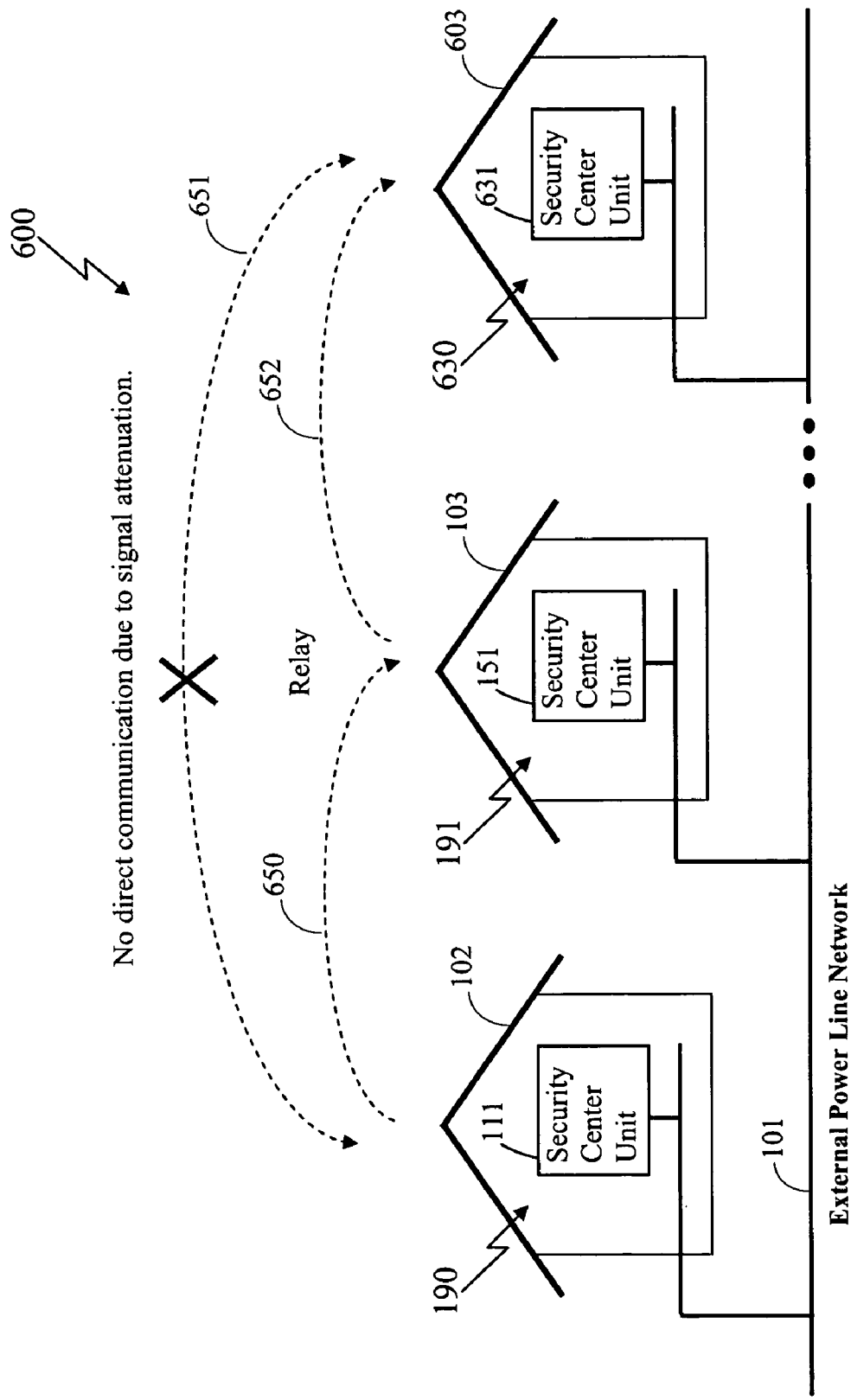
FIG. 6 depicts a simplified block diagram of a PLC security system including a message relay mechanism.

FIG. 6 depicts a simplified block diagram of a PLC security network 600 similar to the network 100 of FIG. 1. The PLC security network 600 in part provides an alarm message and/or intercom communication relaying and/or rebroadcasting according to some embodiments. In the event of an emergency, a first local PLC security system 190 of a first residence 102, for example, broadcasts a remote alarm message over the external PLC network 101. Neighboring PLC security systems 191 that are within relatively short distances along the external PLC network 101 typically receive the remote alarm message. Other neighboring PLC security systems 630, however, at relatively long distances along the external PLC network 101 may not receive the remote alarm message due at least in part to signal attenuation caused, for example, by noise on the external PLC network 101.

Some embodiments, however, provide for a relaying and/or rebroadcasting of remote alarm messages and/or intercom communications to provide a greater distribution of the remote alarm message and/or intercom communications. For example, when a first PLC security system 190 generates and transmits a remote alarm message, represented by the arrow labeled 650, over the external PLC network 101, a relatively close neighboring PLC security system 191 accurately receives the remote alarm message 650. A distant neighbor 603, however, may be unable to receive the remote alarm message transmitted, represented by the arrow labeled 651 and crossed out.

In some embodiments, the second security center unit 151 of the relatively close neighboring PLC security system 191 acts as a relay and rebroadcasts the remote alarm message received from the first security center unit 111. Because the second security center unit 151 is located in closer proximity to the third security center unit 631 on the external PLC network 101, the remote alarm message rebroadcast, represented by the arrow labeled 652, can be received by the third PLC security system 630 due to its relatively close proximity along the external PLC network 101 to the second security center unit 151 overcoming the signal attenuation effects of the external PLC network 101. The alarm message relay may allow an alarm message to propagate farther along the external PLC network 101, thereby increasing the probability that one or more neighbors receive the remote alarm message.

In some embodiments, the number of rebroadcasts of an external alarm message 650 is limited to reduce the likelihood that the message continues to be broadcasted, which can be a waste of network bandwidth. For example, a second security center unit 151 receiving the remote alarm message 650 over the external PLC network 101 can mark the remote alarm message as a rebroadcast remote alarm message prior to rebroadcasting the alarm message over the external PLC network 101. The third security center unit 631 receives the rebroadcast alarm message 652 and activates a local alert device such as an alarm buzzer and/or displays the remote alarm message on a display. The third security center unit 631, however, detects the rebroadcast mark and does not rebroadcast the message because the remote alarm message has already been rebroadcast. The determination of when not to rebroadcasting can be based on many factors, such as a rebroadcast count or number of times an alarm message has been rebroadcast (e.g., the alarm message is to be marked as rebroadcast and rebroadcasted at least a rebroadcast threshold number of times before a PLC security system does not rebroadcast), a residence is a last residence on an external PLC network and thus rebroadcasting would not propagate the message to a residence that has not already received the message, the PLC security network 600 may be configured such that one or more specific types of remote alarm messages may not be subject to rebroadcasting, and other such conditions and/or combinations of conditions.

Further in some embodiments, the rebroadcasting and/or propagation of a remote alarm message is curtailed by an expiration time or broadcast time limit since an initial broadcast over the external PLC network of the remote alarm message. Prior to the expiration time of the remote alarm message, security center units that receive the remote alarm message rebroadcast the remote alarm message over the external PLC network 101. Once the expiration time has been reached, a security center unit receiving the alarm message generates a local alarm notification (e.g., buzzer), but the security center unit does not rebroadcasting the alarm message over the external PLC network 101. Furthermore, in some embodiments, a security center unit 111 is configured to discard duplicate remote alarm messages when a duplicate remote alarm message is received from the same source within a period of time less than a configurable threshold period. An additional remote alarm message received from the same source outside of the threshold elapsed period is not discarded and the remote alarm message is processed and/or rebroadcasted.

Figure 7:
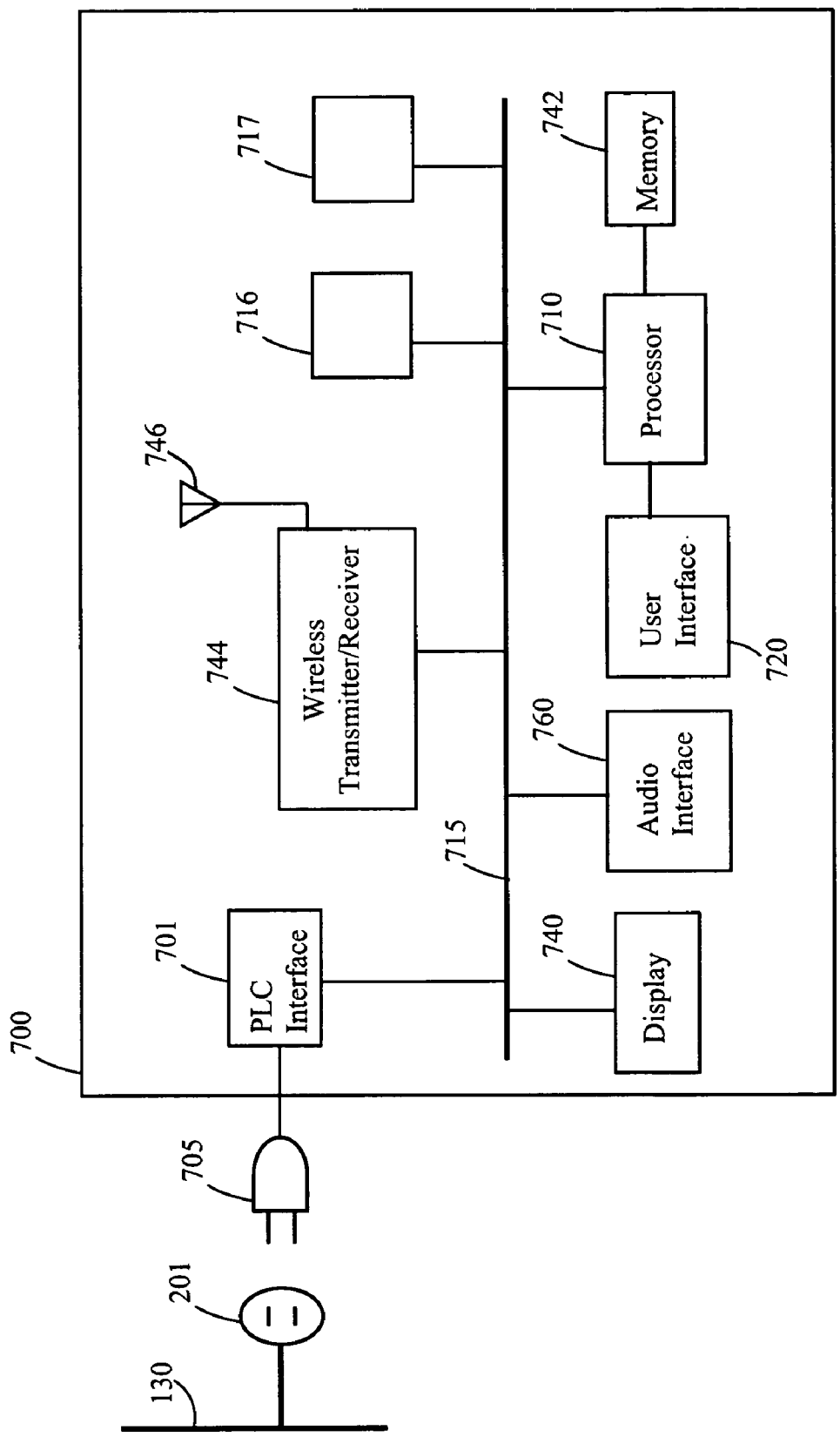
FIG. 7 depicts a simplified block diagram of a consumer electronic device comprising a PLC security system unit.

FIG. 7 depicts a simplified block diagram of a consumer electronic device 700 that includes the functionality of the PLC security system unit 111. The consumer electronic device 700 includes a power line network interface ("PLC interface") 701, an internal bus 715, a processor 710, memory 742, one or more consumer electronic components 716-717 for performing the operations of the consumer electronic product, and a power source, such as a plug interface 305 and/or battery. Some embodiments optionally include a user interface 720, a display 740, a wireless transmitter/receiver 744, an antenna 746, and an audio interface 760. The user interface 720, display 740, the processor 710, the memory 742 and/or audio interface 760 may be parts of the consumer electronic device, such as when the consumer electronic device is a computer or television. For example, the consumer electronic device 700 can be a television and the display device includes a screen with consumer electronic device components 716-717 including signal processor(s), channel selection, tuner, memory and other relevant components for processing and displaying television signals; a stereo system with a liquid crystal display (LCD) and consumer electronic device components 716-717 including signal processor(s), channel selection, tuner, device selection, memory and other relevant components for processing and displaying music, radio, and/or other relevant signals; a computer with consumer electronic device components 716-717 including one or more processors, memory and other relevant computer components; or other consumer electronic devices.

The plug interface 705 couples the consumer electronic device 700 to a power outlet 201 which is coupled to an internal PLC network 130. The consumer electronic device may be substantially any consumer electronic device capable of processing local and/or remote alarm messages and initiating notification of a user, either by generating visual and/or audible alarms at the consumer electronic device 700 and/or communicating over the internal PLC network 130 to other devices of the network capable of generating such notification. For example, the consumer electronic device can include devices capable of displaying alarm message information and/or capable of producing a human-audible alert. The alarm message information may comprise, for example, alarm source information such as the name of a resident and address of the residence, an alarm type, such as, for example, fire, medical emergency, intruder and the like. The audio interface 760 may be and/or can include substantially any speaker, buzzer, or other relevant device capable of producing a human-audible alert, such as, in some embodiments, a television speaker, radio speaker or the like. The display 740 may be substantially any display device capable of displaying alarm message information, such as LCD, LED, plasma and other such displays. The wireless transmitter/receiver 744 and the antenna 746 have similar functionality as the wireless transmitter/receiver 270 and the antenna 275.

The user interface 720 may be substantially any interface that allows a user to enter and adjust parameters and settings, retrieve system information, configure the system, control the security center functionality for PLC security system implementation, and/or configure the consumer electronic device 700. For example, in some embodiments, the consumer electronic device may comprise a personal computer and the user interface 720 may comprise a computer keyboard, mouse, other interfaces and/or combinations of interfaces. In alternate embodiments, the consumer electronic device may comprise a digital video recorder or DVD player and the user interface 720 may comprise a remote control.

Figure 8:
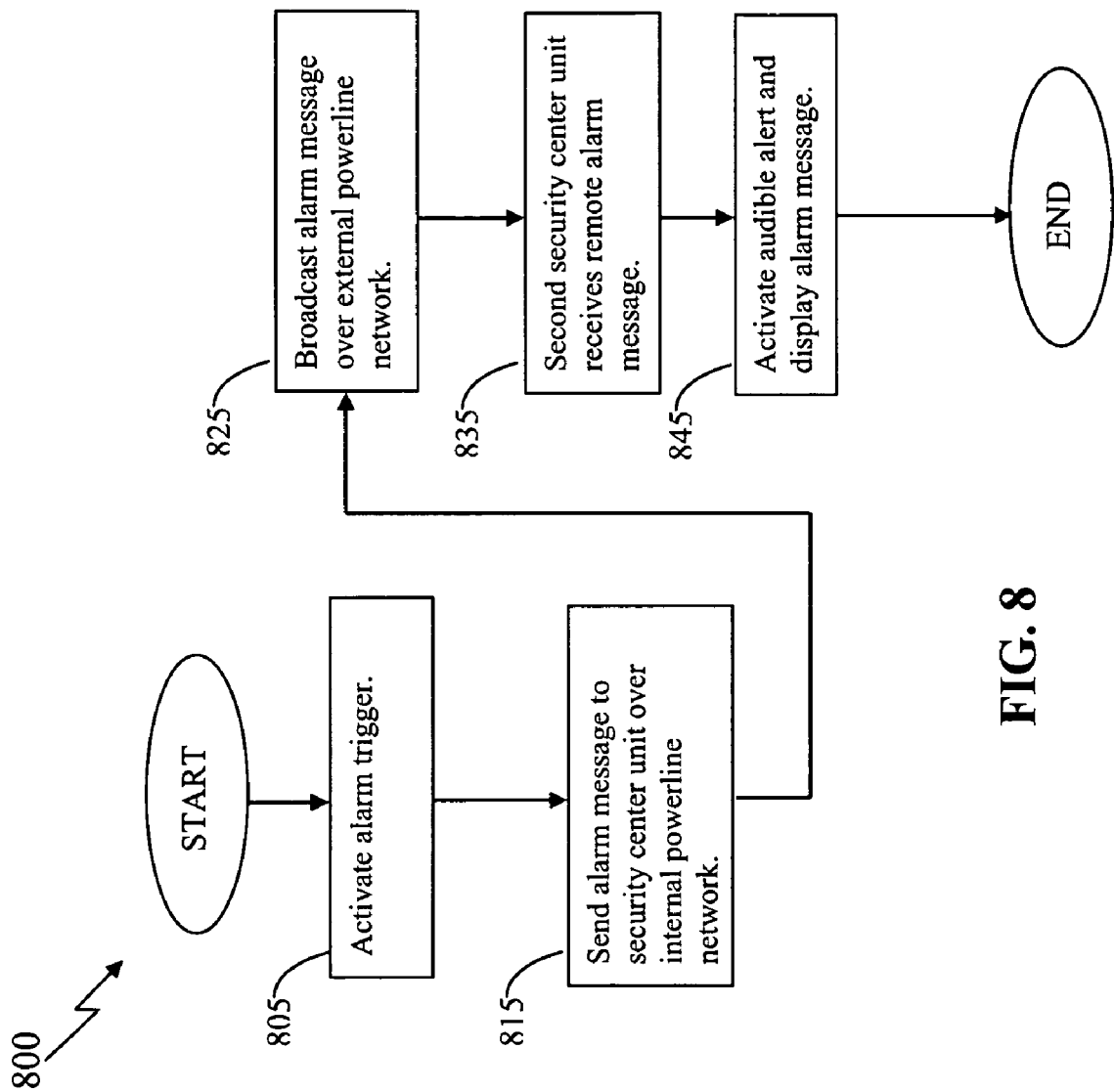
FIG. 8 depicts a simplified flow diagram of a process for receiving an alarm message over an internal PLC network.

FIG. 8 depicts a simplified flow diagram of a process 800 for use in communicating an alarm message over a PLC security network 100. In step 805, an alarm trigger is activated. In some embodiments, the alarm trigger of step 805 may comprise a sensor, such as, for example, a sensor on a window or door that is triggered when the window or door is opened. The trigger may be a motion sensor that is triggered by motion within the area monitored by the motion sensor. Additionally or alternatively, the alarm trigger may be a PLC button unit 121 or a wireless button unit 171. In step 815, a local alarm message is sent to a first security center unit 111 over a first internal PLC network 130. In certain embodiments, step 815 is optional. In step 825, the first security center unit 111 detects the type of alarm message, determines whether to broadcast the message, and broadcasts a remote alarm message over the external PLC network 101 when appropriate (e.g., local alarm messages are typically communicated over the external PLC network 101, while some intercom voice communications may be local communications and intended to be restricted to the internal PLC network 130). In certain embodiments, step 815 is optional. For example, when the activation of the alarm trigger of step 805 is an activation of a button unit 121, the button unit 121 broadcasts an alarm message directly to the second security center unit 151. The remote alarm message 650 can include information, such as, source identifier information, alarm type information and other relevant information. In step 835, a second PLC security center unit 151 receives the remote alarm message broadcast by the first PLC security center unit 111. In step 845, the second PLC security system 191 then activates an audible alert and/or displays an alarm message that can include alarm information and/or details. Thus, one or more neighbors are alerted to the emergency at the residence 102 and could respond and/or summon help.

Figure 9:
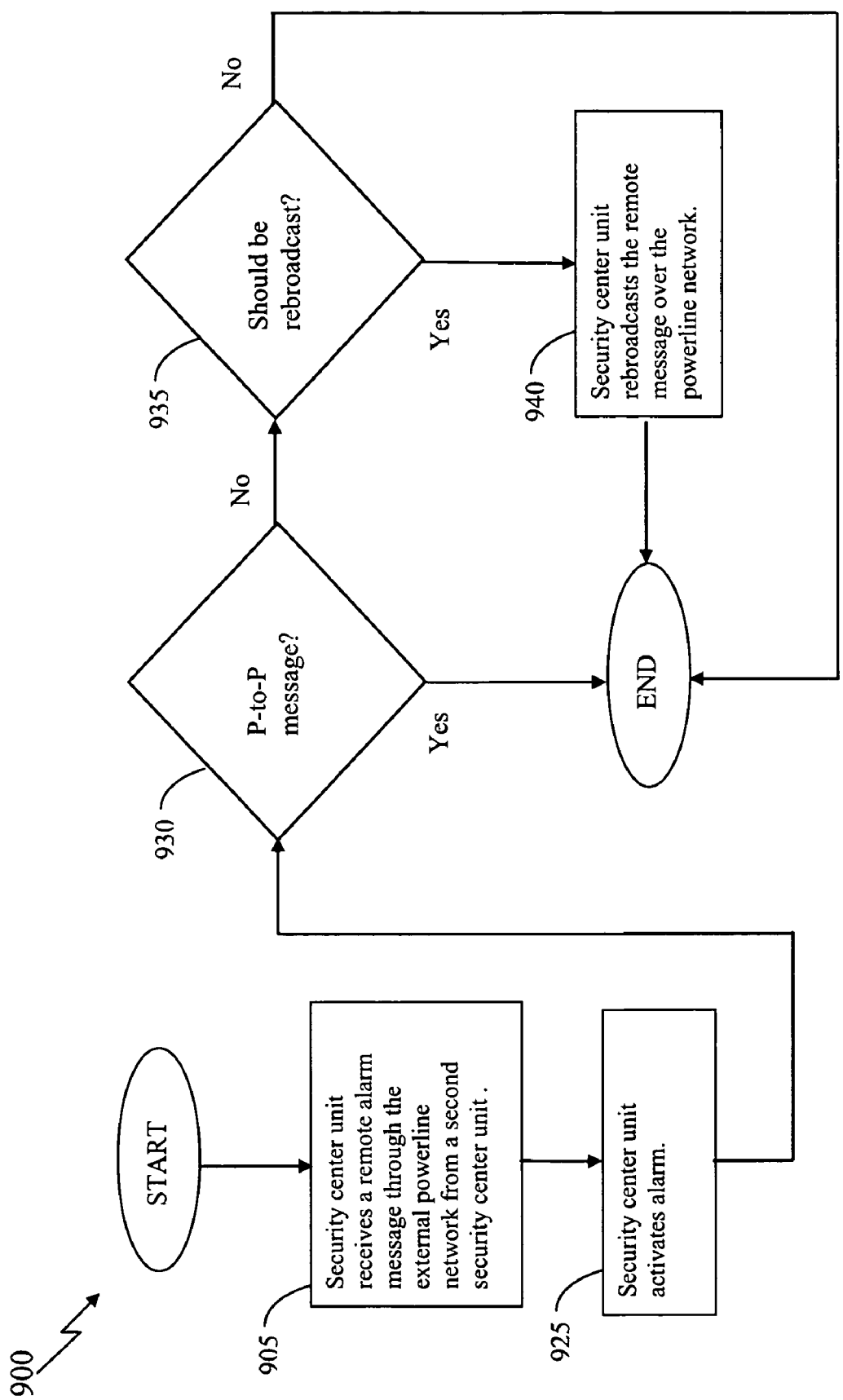
FIG. 9 depicts a simplified flow diagram of a process for receiving an alarm message over an external PLC network and rebroadcasting the alarm message over the external PLC network.

FIG. 9 depicts a simplified flow diagram of a process 900 for receiving an alarm message over an external PLC network 101 and rebroadcasting the alarm message over the external PLC network. In step 905, a second security center unit 151 of a second PLC security system 191 receives a remote alarm message 650 from a first security center unit 111 of a first PLC security system 190 through the external PLC network 101. In step 925, the second security center unit 151 detects that the received communication is a local alarm and activates a local alert device, for example, a buzzer. In step 930, the second security center unit 151 determines whether the remote alarm message 650 is a point-to-point message. When the remote alarm message is a point-to-point message, the remote alarm message is not rebroadcasted because it is intended for a specific receiver and the process 900 ends.

When the remote alarm message is not a point-to-point alarm message, step 935 is entered where the second security center unit 151 evaluates the remote alarm message 650 to determine whether the message is to be rebroadcast. In some implementations, the rebroadcasting of remote alarm messages may be limited. For example, in instances where the security center unit 151 has previously received the remote alarm message, the remote alarm message includes markers indicating that the message has already been rebroadcast a predefined number of times, an alarm time period has expired, and other such conditions that may limit the rebroadcasting of a remote alarm message. When the remote alarm message is not to be rebroadcast, the process terminates. Alternatively, the process continues to step 940 where the second security center unit 151 generates a rebroadcast message 652 rebroadcasting the remote alarm message over the external PLC network 101.

Figure 10:
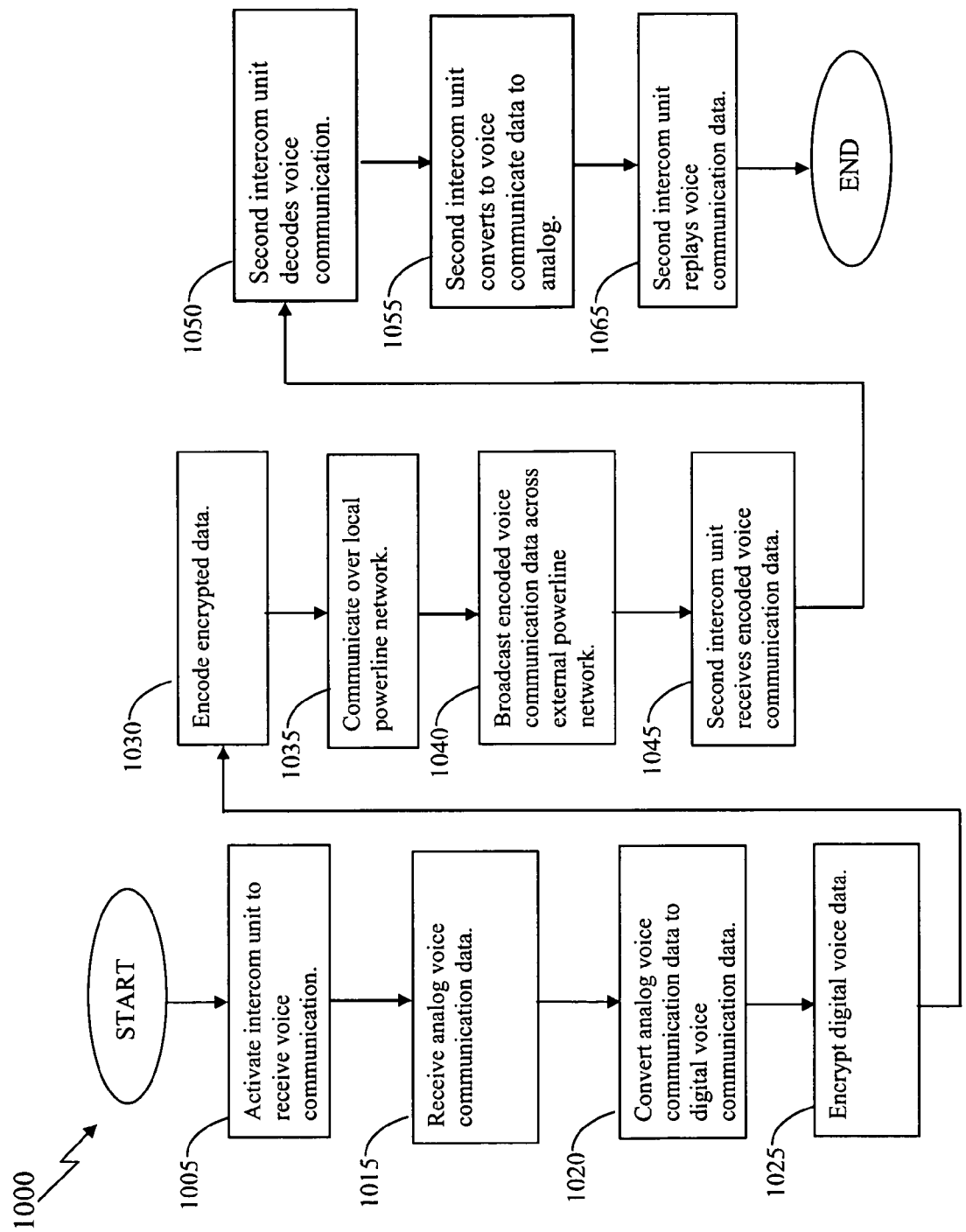
FIG. 10 depicts a simplified flow diagram of a process for receiving an intercom message over an internal PLC network and broadcasting the intercom message over an external PLC network.

FIG. 10 depicts a simplified flow diagram of a process 1000 for use in receiving an intercom message over a local PLC security system 190 and communicating the intercom message over an external PLC network 101. In step 1005, a first intercom unit 500 is activated to receive a voice communication. In step 1015, the first intercom unit 500 receives analog voice communication data through a microphone 570 or other detector. In step 1020, the analog voice communication data is converted to digital voice communication data. In step 1025, the digital voice communication data is encrypted producing encrypted voice data. In step 1030, the encrypted voice data is encoded for transmission, for example, using an audio codec 572. In optional step 1035, the encoded data is communicated over the internal PLC network 130 when the intercom unit 500 is not part of the security center unit 111. In step 1040, the encoded data signal is broadcast across the external PLC network 101. In step 1045, a second intercom unit 500 in a second PLC security system 191 receives the encoded data signal from over the external PLC network 101. In step 1050, the second intercom unit decodes and optionally decrypts the voice communication data using a second audio codec 572 and decryptor 591. In step 1055, the second intercom unit converts the voice communication data to analog voice communication data. The second intercom unit activates the audio system (e.g., speaker 570) to play back the voice communications data in step 1065.

The process 1000 is repeated when the second intercom unit generates a new voice communication and/or sends a voice communication in response to the voice communication broadcast from the first intercom unit. In some embodiments, intercom communications are broadcast over the external PLC network 101 to be received by multiple intercom units communicationally coupled to the external PLC network 101. Therefore, the response could potentially be heard by many neighbors sharing the external PLC network 101 in those instances where the voice communication is not encrypted or otherwise protected. This may be beneficial in the event of an emergency where a coordinated response is desirable, such as in the case of fire where multiple residences may be affected. In some implementations, the intercom communications may be communicated as point-to-point communications.

Figure 11:
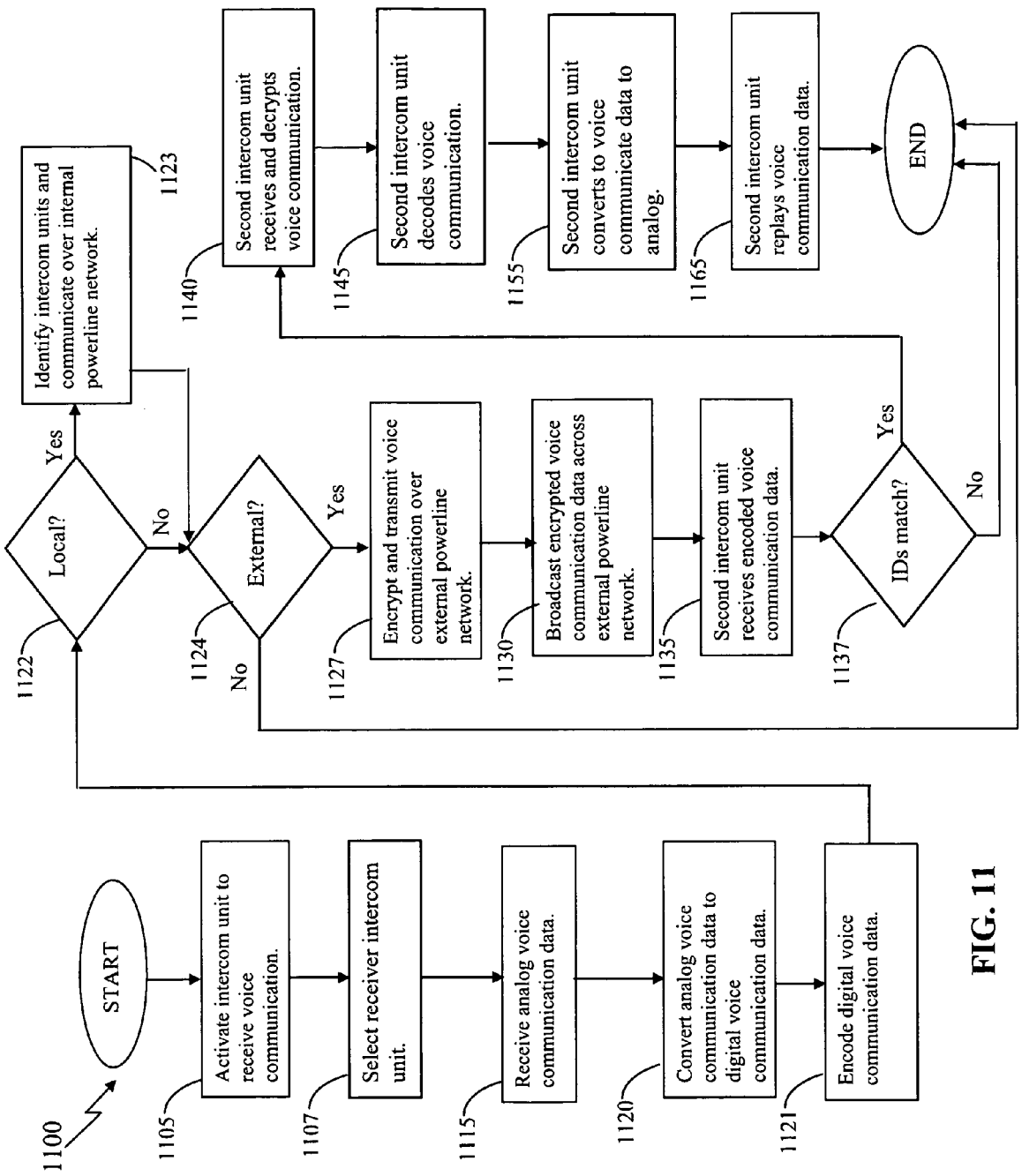
FIG. 11 depicts a simplified flow diagram of a process for receiving an intercom message over an internal PLC network and communicating the intercom message over an external PLC network in a point-to-point communication.

FIG. 11 depicts a simplified flow diagram of a process 1100 for use in receiving an intercom message and communicating the intercom message over an internal PLC network 130 and/or an external PLC network 101 in a point-to-point communication. In step 1105, a first local intercom unit 500 is activated to receive a voice communication. In step 1107, a remote intercom unit that is to receive the communicated intercom message is selected. In some embodiments, the first local intercom unit 500 can generate and display one or more lists of available intercom units accessible over the internal PLC network 130 and/or the external PLC network 101 that can receive a message from the activated local intercom unit, allowing a user to select one or more of the displayed intercom units to receive the message. Additionally and/or alternatively, the intercom unit to receive the message can be identified or selected by entering a receiver unit identification through a user interface 550 of the intercom unit or coupled to the intercom unit.

In step 1115, the first local intercom unit 500 receives analog voice communication data through a microphone 570 or other detector. In step 1120, the analog voice communication data is converted to digital voice communication data. In step 1121, the digital voice communication data is encoded for transmission with an audio codec 572 and optionally in some instances an identifier of the local intercom unit and/or the one or more desired destination intercom units may be incorporated into the communication. In step 1122, the process 1100 determines whether the intercom message is to be communicated locally. When the intercom message is to be communicated locally, step 1123 is entered where the selected one or more local intercom units are identified and the message is communicated over the internal PLC network 130. In some implementations the intercom message may be encrypted or otherwise protected prior to communicating over the internal PLC network 130. In step 1124 it is determined whether the intercom message is to be communicated over the external PLC network 101. When the intercom message is not to be communicated over the external power line network, the process terminates.

In step 1127, the digital voice communication data is encrypted to protect the message in attempts to ensure privacy. The encryption attempts to prevent unauthorized or undesired persons from listening to the voice communication. A neighbor could potentially receive and listen in to an unencrypted voice communication, because the voice communication is broadcast across the external PLC network 101. In step 1130, the encrypted voice communication data is broadcast across the external PLC network 101.

In step 1135, a second remote intercom unit 500 receives the encoded voice communications data over the external PLC network 101. In optional step 1137, the second intercom unit checks to see whether a receiver identifier is included with the encoded voice communications data and whether the identification matches an identifier of the second intercom unit. When the receiver identifier included with the encoded voice communications data and the identifier of the second intercom unit do not match, the intercom unit does not process and play the voice data and the process ends. Otherwise, the process continues with step 1140. This checking for an identification can may be eliminated in some instances where the intercom message cannot be decrypted without appropriate authorization (e.g., a matching decryption key), and thus the identification. In step 1140, the second intercom unit decrypts the encrypted voice communication data. In step 1145, the second intercom unit decodes the voice communication data. In step 1155, the second intercom unit converts the voice communication data to analog. The second intercom unit plays back the voice communications data in step 1165. Furthermore, in some embodiments, the second intercom unit may also send a voice communication in response to the voice communication broadcast from the first intercom unit.

Figure 12:
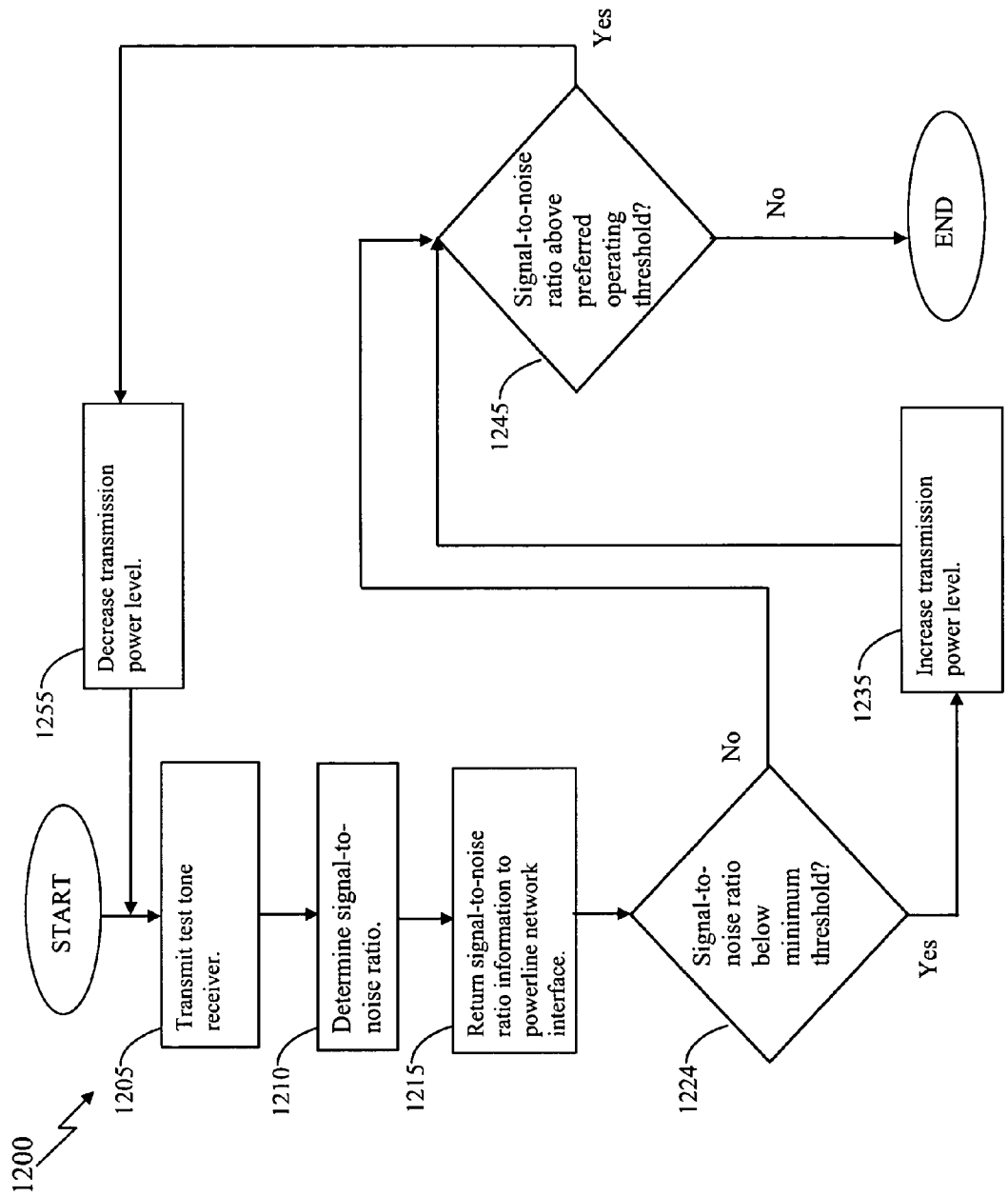
FIG. 12 depicts a simplified flow diagram of a process for adjusting a power level of a transmission in order to maximize available bandwidth of a local and external PLC security network.

FIG. 12 depicts a simplified flow diagram of a process 1200 for use in adjusting a power level of a transmission in an attempt to improve communication over the external PLC network 101 and/or internal PLC network 130. In some embodiments, a PLC interface 210 can reduce and/or be instructed to reduce a transmission power level used when transmitting over an internal PLC network 130 coupled to the PLC interface in order to limit the likelihood that a transmission will be received by a neighboring PLC security system 191, and/or to increase transmission power in attempts to improve the likelihood that a remote alarm message 650 and/or communications intended to be distributed over the external PLC network 101 are received by one or more intended recipients. When the power level of the transmission is sufficiently high, the transmission may pass across the switchboard 110 and onto the external PLC network 101 where it may be received by one or neighboring PLC security systems 191.

In step 1205, test tones are generated by a transmitting device, such as a security center unit 111, intercom unit 500 or other device, and transmitted through a PLC interface 210 to a receiving device communicationally coupled to the internal PLC network 130. The test tones can be substantially any relevant test tone to evaluate the network and signal quality, and in some instances includes a data sequence known by the receiving device or other such test tones. The receiving device determines a signal-to-noise ratio value in step 1210. Noise on the internal PLC network may be caused, for example, by one or more consumer electronic devices that are drawing power from a power line upon which the PLC network has been configured. In step 1215, the receiving device returns the signal-to-noise ratio to the initially transmitting device over the internal PLC network 130. In step 1224, the transmitting device compares the signal-to-noise ratio to a minimum threshold value. When the signal-to-noise ratio is below the minimum threshold, the process 1200 proceeds to step 1235 where the transmission power level is increased in an attempt to overcome the signal noise and/or signal attenuation due, for example, to noise on the internal PLC network 130. In some instances, the increases to transmission power levels are limited, for example, due to governmental regulations (e.g., the Federal Communications Commission may have rules limiting upper transmission power levels). In such instances when transmission power levels reach the upper limit, no further increases are implemented through step 1235. The process then proceeds to step 1245. Alternatively, when the signal-to-noise ratio is greater than the minimum threshold the process proceeds to optional step 1245.

In step 1245, the signal-to-noise ratio is compared to a preferred operating threshold. The preferred operating threshold is a level above which the signal-to-noise ratio is greater than needed to achieve accurate communications and compensating for signal attenuation. When the signal-to-noise ratio is above the preferred operating threshold the system is utilizing unneeded bandwidth and the transmitting device may reduce the power level of transmission without adversely affecting the accurate reception of the communication while conserving network bandwidth and energy by limiting the power drawn to transmit the communication. In step 1255, the power level is reduced and the process 1200 returns to step 1205 to re-transmit test tones. Furthermore, maintaining the transmission power level within the desired range between the thresholds promotes channel reuse among the internal PLC networks 130, 150 in neighboring residences 102, 103. A lower powered signal is less likely to be received and/or interfere with communications of an internal PLC network 150 of a neighboring residence 103 over the external PLC network 101. Therefore in some embodiments, internal PLC networks 130, 150 of neighboring residences 102, 103 can use the same time and/or frequency bandwidth without interfering with one another.

The transmission power levels of a PLC network interface 210, 510 can further be adjusted for transmissions intended to be communicated over the external PLC network 101 to reach a neighbor. In some embodiments, the transmission power through the PLC network interface 210, 510 is set to a maximum power level so that a signal is more likely to reach an internal PLC security system 191 of a neighbor 103 through the external PLC network 101. For example, when a security center unit 111 broadcasts a remote alarm message or an intercom unit 500 broadcasts a voice communication over the external PLC network 101, the transmission level at the PLC interface 210, 510, respectively, can be set to a maximum level. The maximum power level is used for communication among neighbors in an attempt to overcome signal attenuation that might otherwise preclude a transmission from reaching as many neighbors as possible on the external PLC network. In other embodiments, a process similar to the process 1200 is employed to maintain the transmission power levels within a desired range in an attempt to better optimize the bandwidth of the external PLC network 101 and/or internal PLC networks 130, 150.

Figure 13:
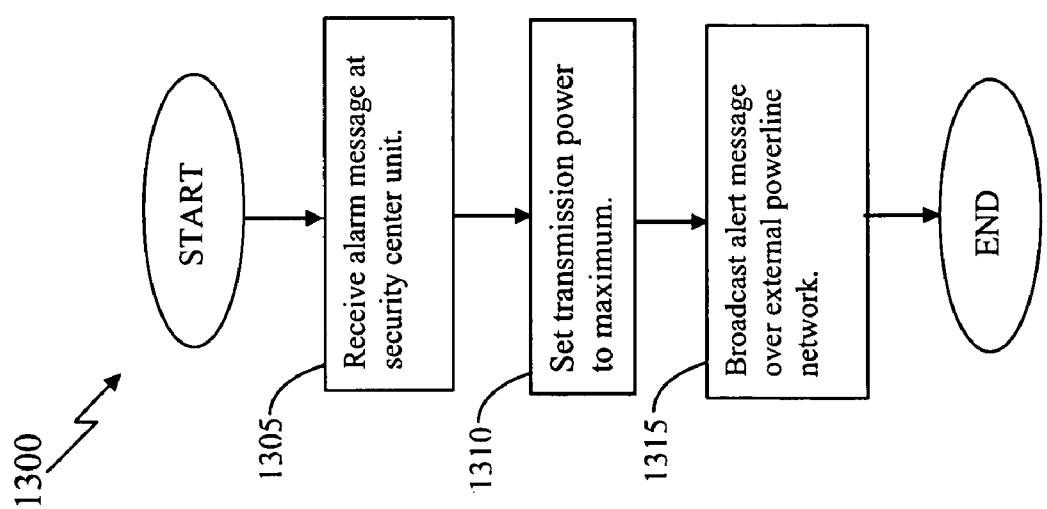
FIG. 13 depicts a simplified flow diagram of a process for adjusting a power level of a transmission to a maximum level when transmitting an alarm message.

FIG. 13 depicts a simplified flow diagram of a process 1300 for adjusting a power level of a desired transmission power level, such as to a maximum level, when transmitting a remote alarm message or other communication over the external PLC network 101. In step 1305, a security center unit 111 receives an alarm message over an internal PLC network 130. In step 1310, the transmission power level of a PLC interface 210 of the security center unit 111 is set to a maximum power level. The PLC network interface then broadcasts a remote alarm message 650 over the external PLC network 101 at the maximum power level. The maximum power level is utilized in an attempt to overcome signal attenuation and noise on the external PLC network 101 so that as many neighbors 103, 603 on the external PLC network as possible receive the remote alarm message 650. Additionally, the transmission of a rebroadcasted alarm message 652, in some implementations, can also be transmitted at maximum power levels in attempts to improve distribution of the alarm message. Similarly in some embodiments, a PLC interface 510 of an intercom unit 500 can be set with the transmission power level to the maximum level when broadcasting voice communications to neighbors 103, 603 so that the signal is able to propagate farther along the external PLC network 101 in an attempt to reach the intended neighbor and/or to communicate with many neighbors.

Figure 14:
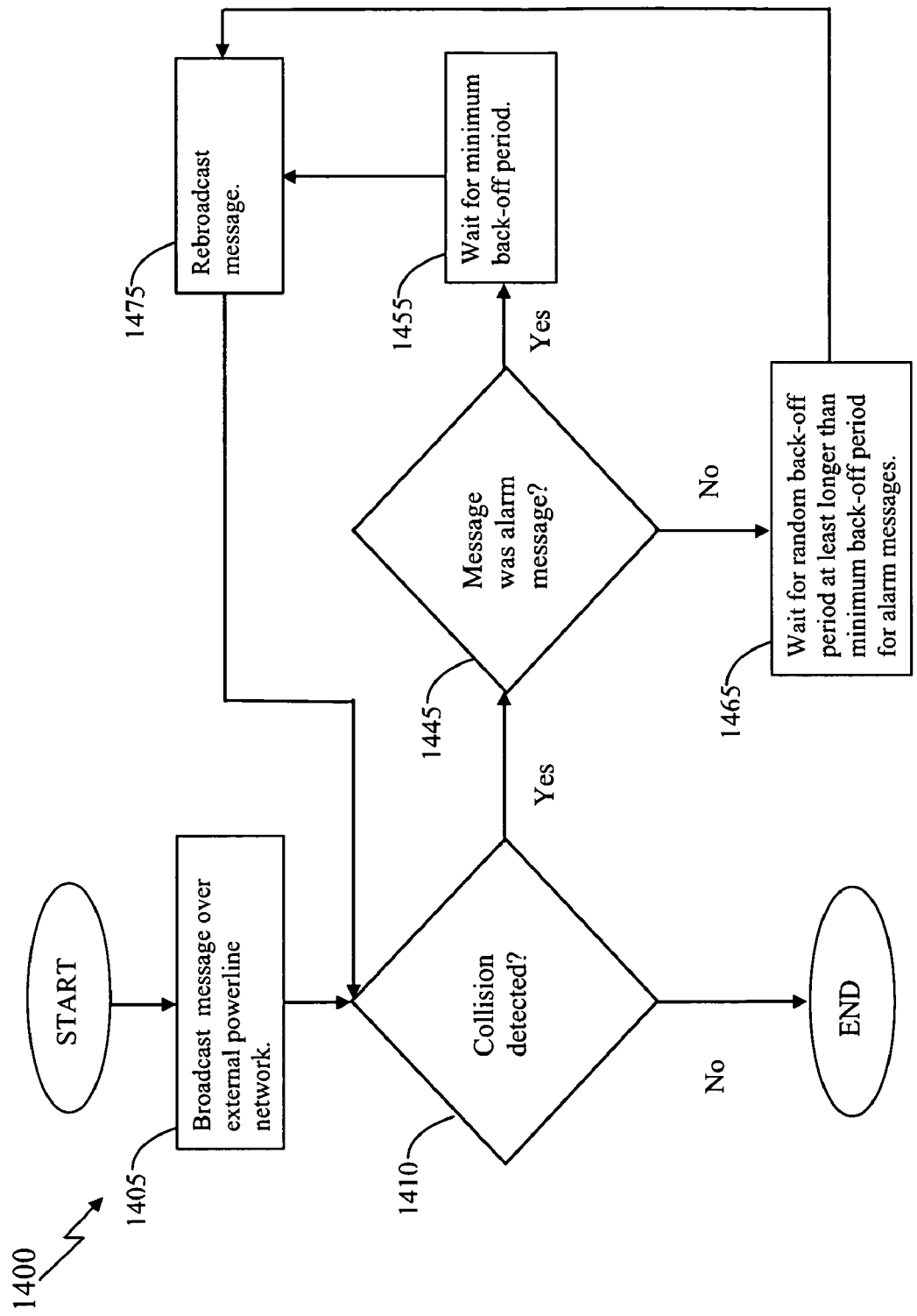
FIG. 14 depicts a simplified flow diagram of a process for rebroadcasting an alarm message when a collision causes an alarm message transmission to fail.

FIG. 14 depicts a simplified flow diagram of a process 1400 for use in rebroadcasting an alarm message and/or intercom communication when a collision causes an alarm message and/or intercom communications transmission to fail. In some embodiments, the internal and/or external PLC networks 130, 101 may be configured to operate with a protocol where data collisions are possible when two or more devices attempt to transmit simultaneously across the PLC network. For example, the PLC networks 130, 101 may utilize the Carrier Sense Multiple Access (CSMA) protocol. In some embodiments, the PLC network interface, for example, monitors each transmission to ensure that a collision has not taken place when an alarm message has been transmitted. In the event of a data collision, each of transmitters associated with one of the colliding communications waits a back-off period of time that can be a random amount of time, a predetermined time with each communicating device having a different set time or other such periods, before attempting to transmit again. Due to the urgent nature of alarm messages, alarm messages are typically given a highest priority and are given a short back-off period to ensure that alarm messages are retransmitted as quickly as possible. As such, in some implementations, a transmitting device (e.g., an alarm or PLC button unit 121, 171, an intercom unit 500 or other such devices) may include multiple back-off periods and/or employ different random generation periods depending on a priority of the communication.

In step 1405, a PLC interface 210, 510 broadcasts a message over the external PLC network. In step 1410, the PLC interface determines whether there was a data collision that prevented the transmission. When no collision occurs, the process 1400 is complete and terminates. Otherwise, in step 1445, it is determined whether the message was an alarm message. When the transmission was an alarm message, the process 1400 proceeds to step 1455, where the PLC interface 210, 510 determines a minimum back-off period and waits for a at least the determined minimum back-off period before proceeding to step 1475. When the message was not an alarm message, the process 1400 proceeds to step 1465 where the PLC interface 210, 510 determines a communication back-off period and waits the determined communication back-off period that is typically greater than the minimum back-off period associated with alarm messages. In step 1475, the transmitting device rebroadcasts the message after waiting for the minimum or communication back-off period. The process then returns to step 1410 to determine whether a data collision occurred when the message was rebroadcasted.

While the invention herein disclosed has been described by means of specific embodiments and applications thereof, numerous modifications and variations could be made thereto by those skilled in the art without departing from the scope of the invention set forth in the claims.

What is claimed is:

1. A method for use in implementing a security system, comprising:

receiving a remote alarm message broadcast across an external power line communication (PLC) network at a first internal PLC security system coupled with the external PLC network from a remote second internal PLC security system coupled with the external PLC network with the remote alarm message comprising an alarm identifier of a local alarm message from the remote second internal PLC security system;

triggering a local alert at the first internal PLC security system indicating that the remote alarm message has been received across the external PLC network; and rebroadcasting the remote alarm message from the first internal PLC security system over the external PLC network to a remote third internal PLC security system.

2. The method of claim 1, wherein the rebroadcasting further comprises:

evaluating at the first internal PLC security system the remote alarm message;

determining at the first internal PLC security system whether the remote alarm message has been previously received at the first internal PLC security system prior to rebroadcasting; and implementing the rebroadcasting the remote alarm message from the first internal PLC security system over the external PLC network when the remote alarm message has not previously been received.

3. The method of claim 1, wherein the rebroadcasting further comprises:

evaluating at the first internal PLC security system the remote alarm message;

determining at the first internal PLC security system a rebroadcast count of the remote alarm message comprising a number of times that the remote alarm message has been previously rebroadcast; and implementing the rebroadcasting the alarm message from the first internal PLC security system over the external PLC network when the rebroadcast count is less than a rebroadcast count threshold.

4. The method of claim 1, wherein the rebroadcasting further comprises:

evaluating the remote alarm message at the first internal PLC security system;

determining at the first internal PLC security system a time elapsed since an initial broadcasting over the external PLC network of the remote alarm message; and implementing the rebroadcasting of the remote alarm message from the first internal PLC security system over the external PLC network when the time elapsed since the initial broadcasting of the remote alarm message is less than a rebroadcast time limit.

5. The method of claim 1, further comprising:

receiving at the first internal PLC security system a voice communication broadcast over the external PLC network; and transmitting a voice communication response from the first internal PLC security system over the external PLC network after receiving the voice communication.

6. A method for use in implementing a security system, comprising:

receiving a remote alarm message broadcast across an external power line communication (PLC) network at a first internal PLC security system coupled with the external PLC network from a remote second internal PLC security system coupled with the external PLC network with the remote alarm message comprising an alarm identifier of a local alarm message from the remote second internal PLC security system;

triggering a local alert at the first internal PLC security system indicating that the remote alarm message has been received across the external PLC network;

receiving, at a center unit, a voice communication communicated from a first internal communication device, wherein the first internal PLC security system comprises;

a first internal PLC network;

the center unit communicationally coupled with the first internal PLC network; and the first internal communication device communicationally coupled with the first internal PLC network, wherein the receiving the voice communication comprises receiving, at the center unit, the voice communication communicated over the first internal PLC network from the first internal communication device;

encrypting the voice communication at the center unit within the first internal PLC security system generating an encrypted voice communication; and transmitting from the first internal PLC security system a point-to-point voice communication over the external PLC network of the encrypted voice communication.

7. A power line security system comprising:

an alarm trigger coupled to an internal power line communication (PLC) network that communicates a first local alarm message across the internal PLC network;

a local alarm message receiver communicationally coupled to the internal PLC network that receives the first local alarm message communicated over the internal PLC network from the alarm trigger;

a remote alarm message transmitter communicationally coupled to the local alarm message receiver, the remote alarm message transmitter transmits a first remote alarm message over an external PLC network;

a remote alarm message receiver receives a second remote alarm message from over the external PLC network; and a local alert device communicationally coupled to the remote alarm message receiver and produces a local alert signal when the remote alarm message receiver receives the second remote alarm message from over the external PLC network.

8. The PLC security system of claim 7, wherein the remote alarm message transmitter rebroadcasts over the external PLC network the second remote alarm message received by the remote alarm message receiver.

9. The PLC security system of claim 7, further comprising:

a wireless alarm trigger comprising a wireless transmitter that wirelessly transmits a second local alarm message to the local alarm message receiver when the wireless alarm trigger is activated.

10. The PLC security system of claim 7, further comprising:

a voice communications transmitter communicationally coupled to the internal PLC network and external PLC network where the voice communications transmitter transmits first voice communications over the internal PLC network and over the external PLC network; and a voice communications receiver communicationally coupled to the internal PLC network and to the external PLC network where the voice communications receiver receives second voice communications over the internal PLC network and over the external PLC network.

11. The PLC security system of claim 10, wherein the voice communications transmitter further comprises:

an address determination system that determines a destination address of a remote voice communications receiver communicationally coupled to the external PLC network; and an encryption system communicationally coupled with the voice communications transmitter, the encryption system encrypts based upon the determined destination address at least one of the first voice communications generating an encrypted point-to-point transmission message.

12. The PLC security system of claim 7, further comprising:
a PLC network button unit communicationally coupled to the internal PLC network that transmits a second local alarm message through the internal PLC network when the PLC network button unit is activated.

13. The PLC security system of claim 7, wherein the voice communications transmitter further comprises:
a variable power transmitter that adjusts a transmission power level for transmissions over the internal PLC network such that a signal-to-noise ratio has first a predetermined relationship with a first threshold value and a second predetermined relationship with a second threshold that is greater than the first threshold, and adjusts the transmission power level to substantially a maximum power level for transmissions over the external PLC network.

14. A power line communication security system, comprising:
a power line communication (PLC) network interface communicationally coupled to an external PLC network, and the PLC network interface receives a remote alarm message broadcast over the external PLC network;
a local alert device that generates a local warning; and
a processor communicationally coupled with the PLC network interface and the local alert device, the processor receives the remote alarm message from the PLC network interface and activates the local alert device to generate the local warning as a notification that the remote alarm message has been received;
wherein the processor generates a rebroadcast remote alarm message and forwards the rebroadcast remote alarm message to the PLC network interface to be rebroadcasted over the external PLC network.

15. The PLC security system of claim 14, further comprising:
a local PLC network, where in the local alert device and the processor are communicationally coupled with the local PLC network such that the processor activates the local alert device by transmitting a communication over the local PLC network to the local alert device.

16. A power line communication security system, comprising:
a power line communication (PLC) network interface communicationally coupled to an external PLC network, and the PLC network interface receives a remote alarm message broadcast over the external PLC network;
a local alert device that generates a local warning; and
a processor communicationally coupled with the PLC network interface and the local alert device, the processor receives the remote alarm message from the PLC network interface and activates the local alert device to generate the local warning as a notification that the remote alarm message has been received;
wherein the PLC security system is built into a consumer electronic device communicationally coupled to an internal PLC network and the external PLC network; and
wherein the PLC network interface further comprises:
a variable power transmitter that adjusts a transmission power level for transmissions over the internal PLC network such that a signal-to-noise ratio is greater than or equal to a first threshold value and less than or equal to a second threshold that is greater than the first threshold, and adjusts the transmission to substantially a maximum power level for transmissions over the external PLC network.

17. A method for use in implementing a security system, comprising:
receiving a remote alarm message broadcast across an external power line communication (PLC) network at a first internal PLC security system coupled with the external PLC network from a remote second internal PLC security system coupled with the external PLC network with the remote alarm message comprising an alarm identifier of a local alarm message from the remote second internal PLC security system;
triggering a local alert at the first internal PLC security system indicating that the remote alarm message has been received across the external PLC network;
receiving, over a first internal PLC network of the first internal PLC security system, a local alarm message communicated over the first internal PLC network from an alarm unit coupled with the first internal PLC network;
generating, in response to receiving the local alarm message an additional remote alarm message; and
broadcasting, from the first internal PLC security system, the additional remote alarm message over the external PLC network to a remote third internal PLC security system.

* * * * *

UNITED STATES PATENT AND TRADEMARK OFFICE
CERTIFICATE OF CORRECTION

PATENT NO. : 7,701,330 B2
APPLICATION NO. : 11/378684
DATED : April 20, 2010
INVENTOR(S) : Iwamura It is certified that error appears in the above-identified patent and that said Letters Patent is hereby corrected as shown below:

In the CLAIMS:
Claim 13, column 21, line 11, delete "has first a" and insert --has a first--.
Claim 15, column 21, line 37, delete "where in" and insert --wherein--.

Signed and Sealed this

Twenty-fourth Day of August, 2010

David J. Kappos
*Director of the United States Patent and Trademark Office*